United States Patent [19]
Warner et al.

[11] Patent Number: 5,151,960
[45] Date of Patent: Sep. 29, 1992

[54] UNITARY OPTICAL FIBER CONNECTOR

[75] Inventors: Gary N. Warner, Harrisburg; Jason L. White, Duncannon; Edmund J. Haley, Dillsburg; Wallace R. Savitsky; Ronald R. Schaffer, both of Harrisburg, all of Pa.

[73] Assignee: AMP Incorporated, Harrisburg, Pa.

[21] Appl. No.: 682,042

[22] Filed: Apr. 8, 1991

[51] Int. Cl.[5] .......................... G02B 6/00; G02B 6/36
[52] U.S. Cl. ...................................................... 385/53
[58] Field of Search ............................ 350/96.20–96.21

[56] References Cited

U.S. PATENT DOCUMENTS

| | | |
|---|---|---|
| 4,107,242 | 8/1978 | Runge .................................... 264/1 |
| 4,173,389 | 11/1979 | Curtis ................................. 350/96.20 |
| 4,264,128 | 4/1981 | Young ................................. 350/96.20 |
| 4,292,260 | 9/1981 | Cheung ................................. 264/1.5 |
| 4,512,630 | 4/1985 | Runge ............................... 350/96.21 |
| 4,721,357 | 1/1988 | Kovalchick et al. ............. 350/96.20 |
| 4,834,487 | 5/1989 | Abendschein et al. ...... 350/96.21 X |
| 5,018,821 | 5/1991 | Kurata ............................... 350/96.21 |

Primary Examiner—Akm E. Ullah
Attorney, Agent, or Firm—Gerald K. Kita

[57] ABSTRACT

An optical fiber connector 1 comprises, an optical fiber 3 and a flexible buffer 4 and multiple strength members 5 of an optical fiber cable 2, and a holder 8 imbedding the fiber 3 at a front end 9 of the holder 8, and imbedding the buffer 4 and the strength members 5 and an exterior of the cable 2 to provide a unitary connection to component parts of the cable 2.

17 Claims, 7 Drawing Sheets

Fig. 5

UNITARY OPTICAL FIBER CONNECTOR

FIELD OF THE INVENTION

The invention relates to an optical fiber connector having a holder for aligning an optical fiber of an optical fiber cable.

BACKGROUND OF THE INVENTION

Disclosed in U.S. 4,512,630 is a known optical fiber connector comprising, a connector body fabricated directly on an optical fiber in a molding die cavity, by aligning the fiber coaxial within the cavity, and by molding the connector body to the fiber. U.S. 4,834,487 discloses molding an alignment ferrule of an optical fiber connector.

Each of U.S. 4,173,389 and 4,264,128 discloses an optical fiber connector with a connector body, in part, molded directly on an optical fiber in a molding die cavity, and, in part, an insert that surrounds the fiber in the die cavity prior to molding.

SUMMARY OF THE INVENTION

According to the invention, a connector for an optical fiber cable is fabricated by molding plastic material directly onto the cable. The invention provides a complete combination of a cable terminated with a connector. The connector can be molded and assembled to a cable in a shorter time than the time required for fabricating different component parts of prior connectors and assembling the parts to an optical fiber cable by adhesive or compression crimping.

An advantage of the invention is a strong, unitary bond, obtained from imbedding an optical fiber, strength members and an outer jacket of the cable in plastic material comprising an optical connector and strain relief for the cable. The bond prevents breakage of the fiber when the cable and connector are cycled under tension and relaxation testing. In prior connectors, separate bonds of the connector to the fiber and to the strength members were weaker than the unitary bond of the invention, and caused the fiber to break when the bond to the strength members was damaged during tension cycling.

One of the features of the invention is a strain relief that is molded directly onto a fiber optic cable. The cable is imbedded in the strain relief, and yet the strain relief has a series of openings that expose the cable exterior and allow flexure of the strain relief in an arc. The strain relief is closed off against the cable by the molding apparatus, and the edges of the openings are adhered to the cable.

A core pin pilot centers the fiber within the mold apparatus. Side locating pins meet the fiber on opposite sides, leaving side relief openings in the molded connector diametrically opposed. Another set of diametrically opposed locating pins meet the cable exterior on opposite sides to hold the cable centered concentrically in the molding apparatus. These locating pins also leave side relief openings directly opposed.

Another feature of the invention is the need for multiple gating to prevent the cable jacket from being displaced by molten material used to form the connector.

The invention will now be described by way of example with reference to a following detailed description taken in conjunction with the drawings.

Figure 1:
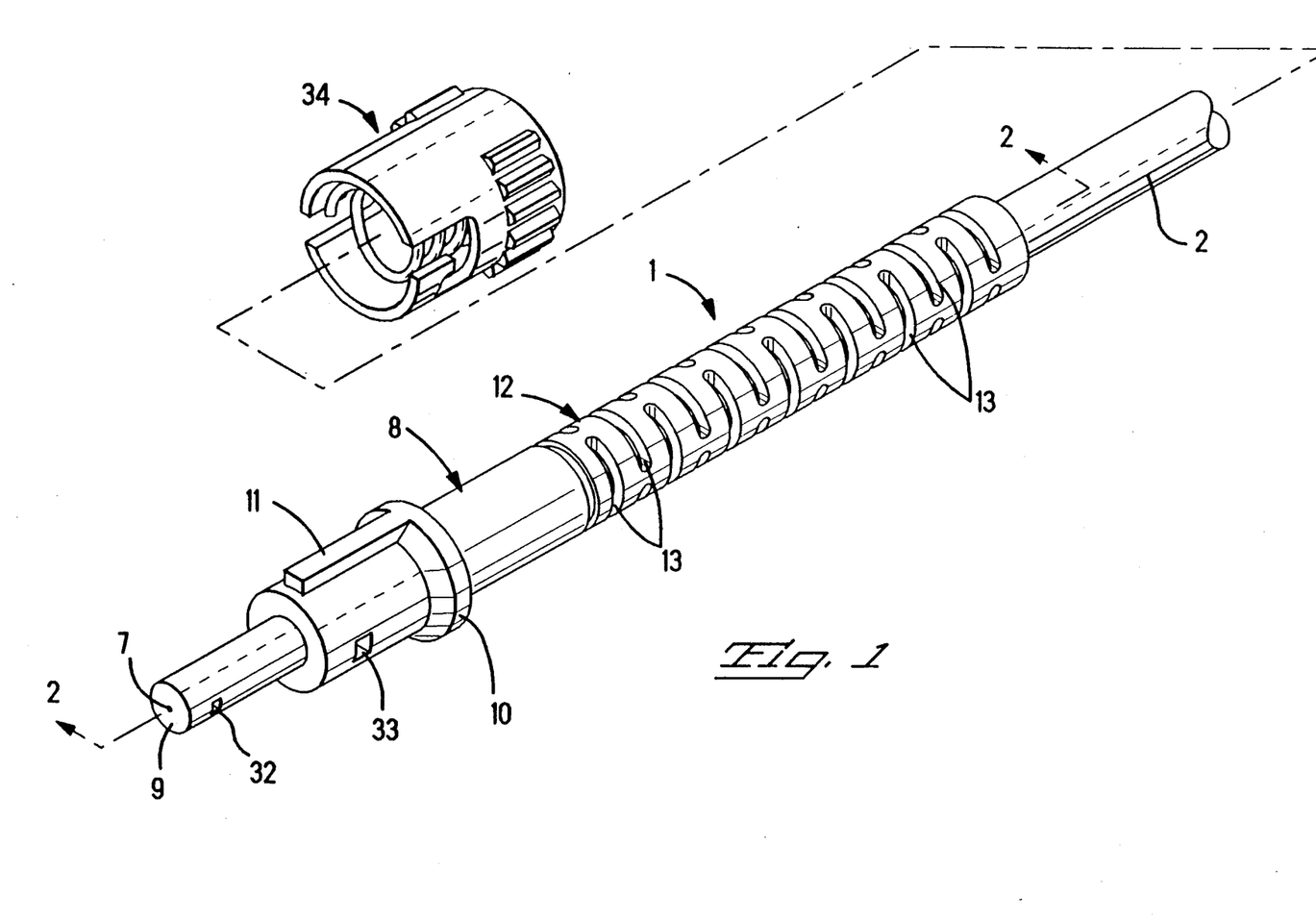
FIG. 1 is a fragmentary perspective view of an optical fiber connector.
Figure 2:
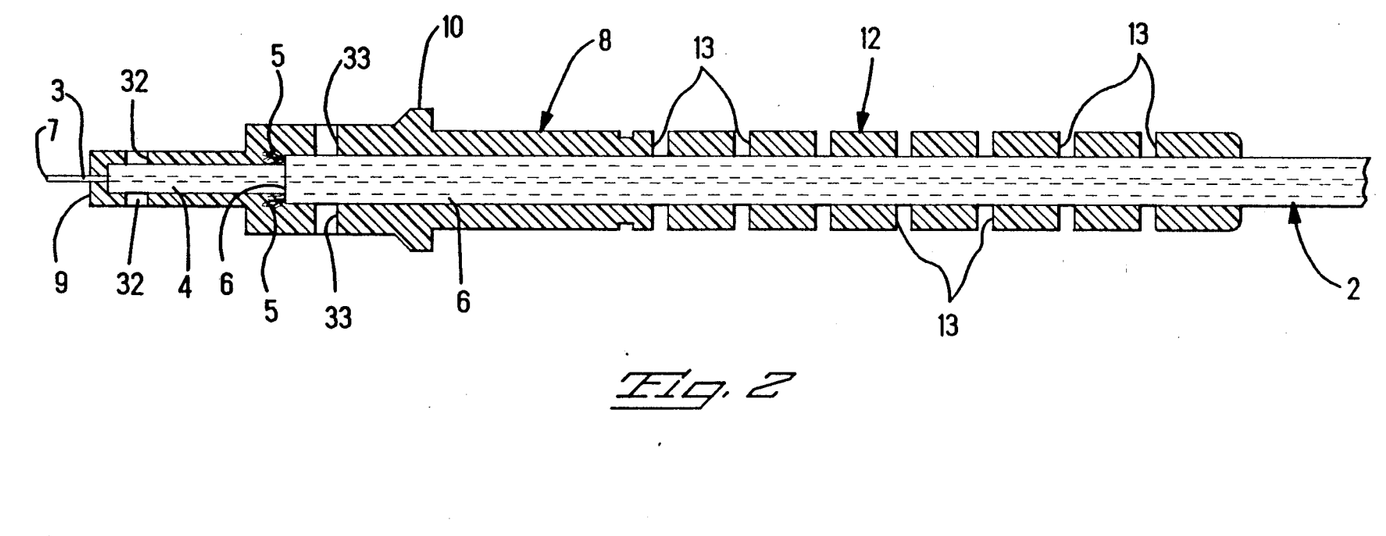
FIG. 2 is a section view of the connector shown in FIG. 1.

With reference to FIGS. 1 and 2 of the drawings, there is shown an optical fiber connector 1 for an optical fiber cable 2. The cable 2 includes an optical fiber 3, concentrically surrounded by a flexible buffer 4, multiple strength members 5 distributed over a circumference of the buffer, and an outer jacket 6 defining an exterior of the cable 2. The cable 2 is trimmed with a knife or other cutting tool, not shown, to provide corresponding projecting portions of the fiber 3, the buffer 4 and the strength members 5 projecting forwardly from the jacket 6. An end face 7 of the optical fiber 3 is optically transmissive.

The connector 1 comprises, a holder 8 for the optical fiber 3 that is unitary and imbeds the corresponding projecting portions of the fiber 3, the buffer 4 and the strength members 5 and an exterior of the cable 2 to provide a unitary connection to all parts of the cable 2. The holder 8 imbeds the fiber 3 at a front end 9 of the holder 8. The holder 8 is required to hold the optical fiber 3 concentrically. The holder 8 is used to align the end face 7 of the optical fiber 3 end to end with an end face of another optical fiber, not shown. A stepped diameter, enlarged collar 10 and a longitudinal projecting key 11 are unitary with the holder 8. The connector I can include a spring loaded coupling nut 34. Such a coupling nut is disclosed in U.S. 4,834,487. The collar 10 is a stop to limit forward movement of the coupling nut.

According to a feature of the invention, the front end 9 of the holder 8 is rigid, and a rear end of the holder 8 forms an arcuately bendable, tubular strain relief 12 for the cable 2. The strain relief 12 encircles the cable 2. The strain relief 12 has multiple openings 13 extending in a series along the exterior of the cable 2. The strain relief 12 is adhered to the exterior of the cable 2 rearward of the projecting strength members 5. Edges of the strain relief 12 around the openings 13 are adhered to the exterior of the jacket 6 of the cable 2. The openings 13 permit flexure of the strain relief 12 and permit the strain relief 12 to bend along an arc together with the encircled cable 2.

Figure 3:
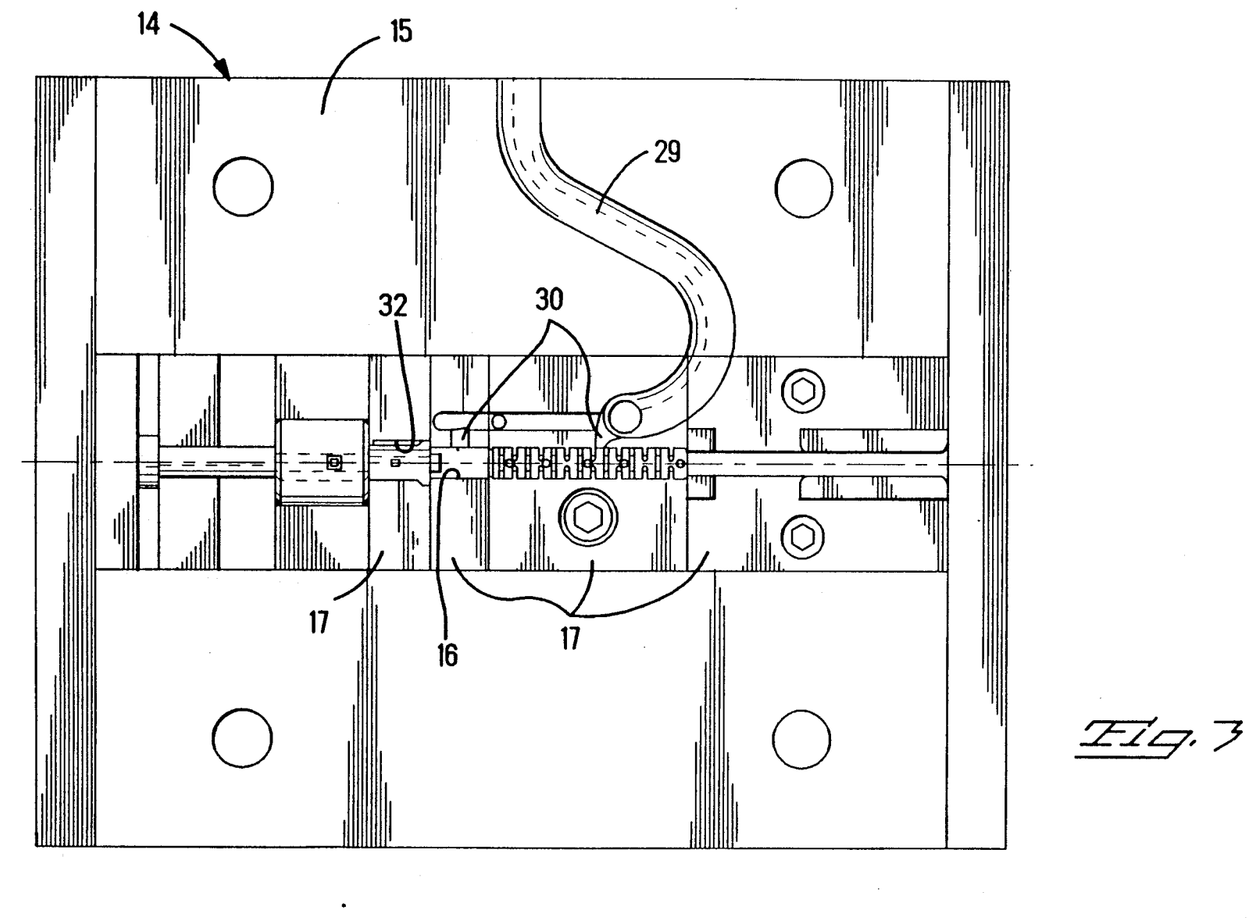
FIG. 3 is a top plan view of a mold die.
Figure 4:
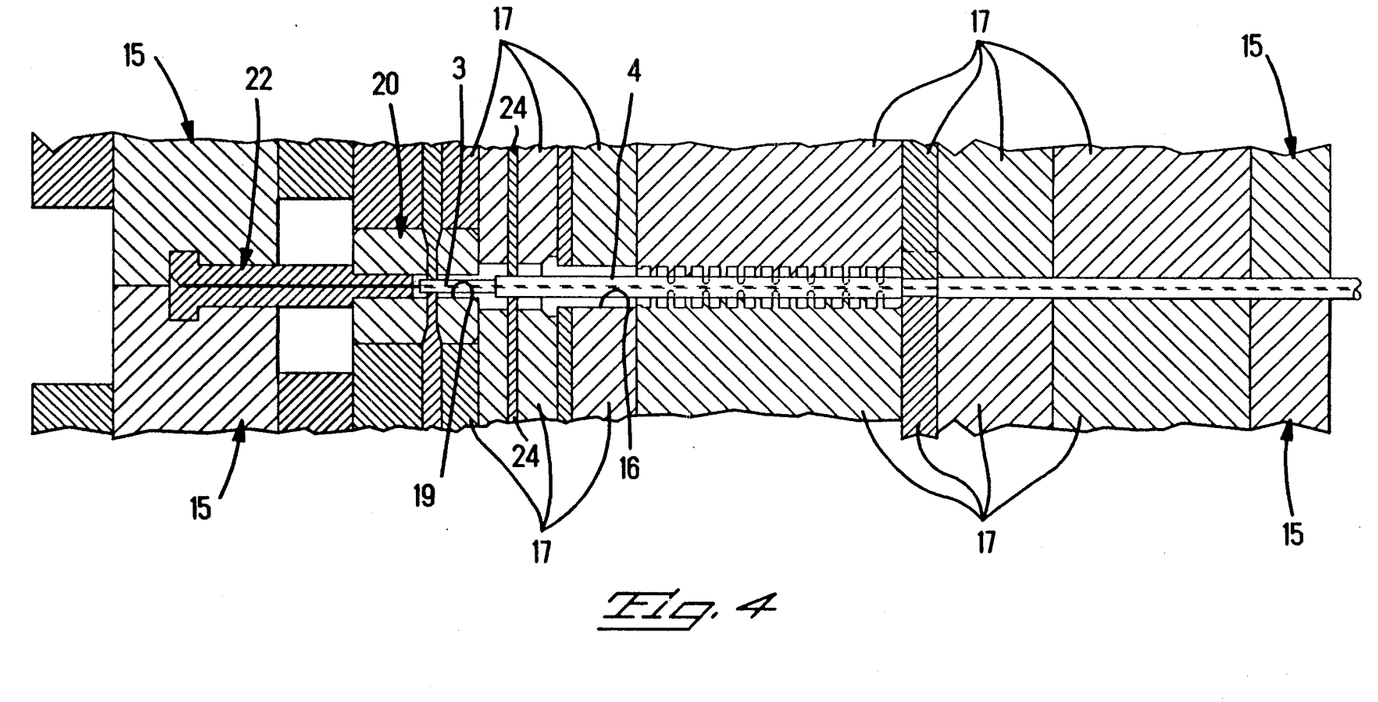
FIG. 4 is a section view of the mold die shown in FIG. 3 together with another compatible die of a molding apparatus.
Figure 5:
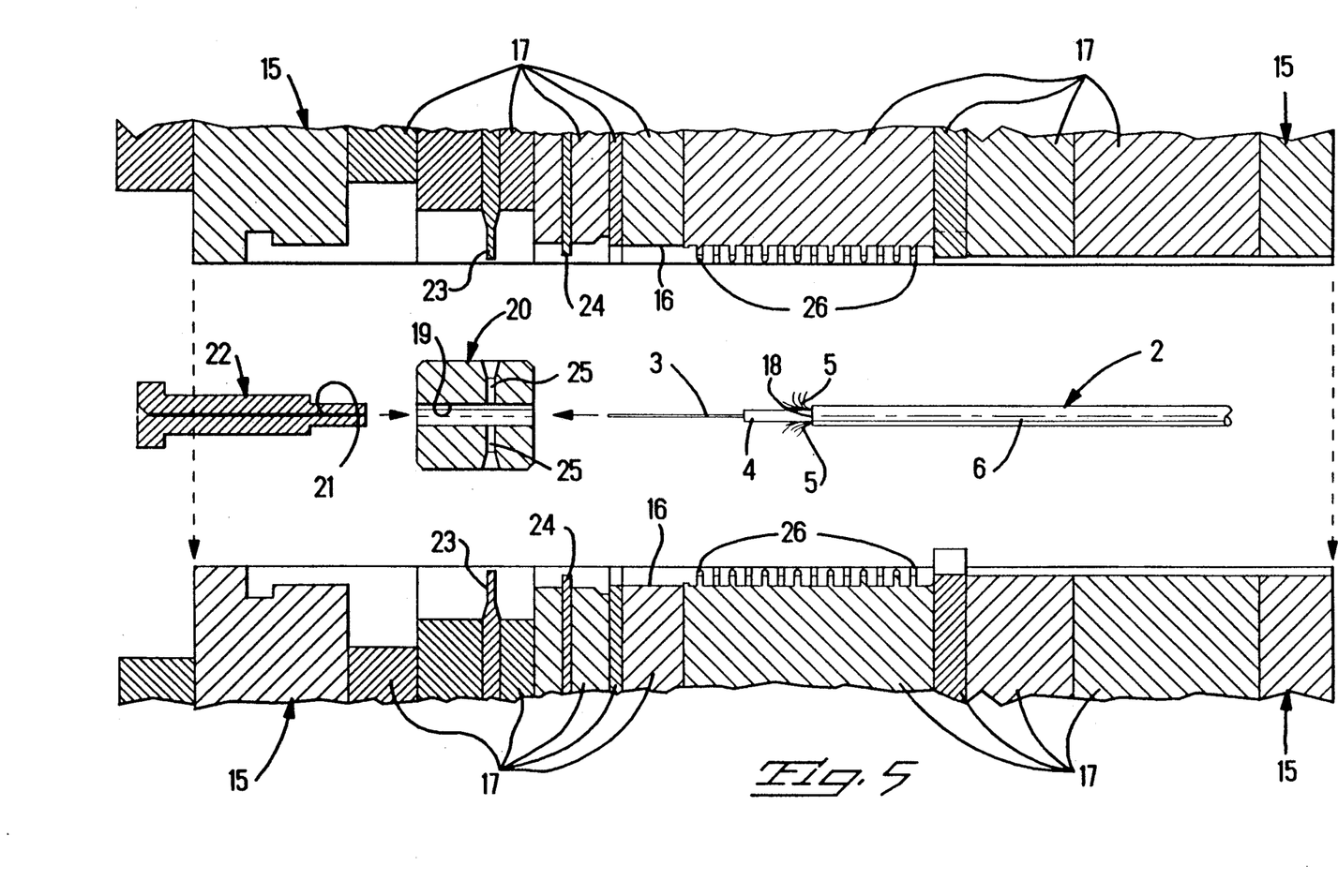
FIG. 5 is a view similar to FIG. 4 with parts

A mold apparatus 14 includes a pair of mold dies 15, one of which is shown in FIG. 3. As shown in FIG. 4, the dies 15 close together and close off a die cavity 16 formed in multiple mold inserts 17 of each mold die 15. As shown in FIG. 5, the dies 15 open apart to open the die cavity 16. Half of the die cavity 16 is recessed in each of the mold inserts 17.

With reference to FIG. 5, a front end 18 of the optical fiber cable 2 is passed through a ring shaped coupling nut 34, FIG. 1, and then is inserted along a cylindrical insert cavity 19 of a cylindrical mold insert 20. The optical fiber 3 projects forward and enters a passage 21 of a core pin 22. The core pin 22 is inserted in the insert cavity 19 and into a front end of the cylindrical mold insert 20, and closes off the insert cavity 19.

With reference to FIGS. 4 and 5, the cylindrical mold insert 20 is then placed in the open die cavity 16, together with the core pin 22 and the cable 2. The mold insert 20 aligns the axis of the passage 21 with the axis of the insert cavity 19 to align the projecting optical fiber 3, such that the fiber 3 extends concentrically along the insert cavity 19, especially at a forward end of the insert cavity 19 where it is closed off by the core pin 22.

Figure 6:
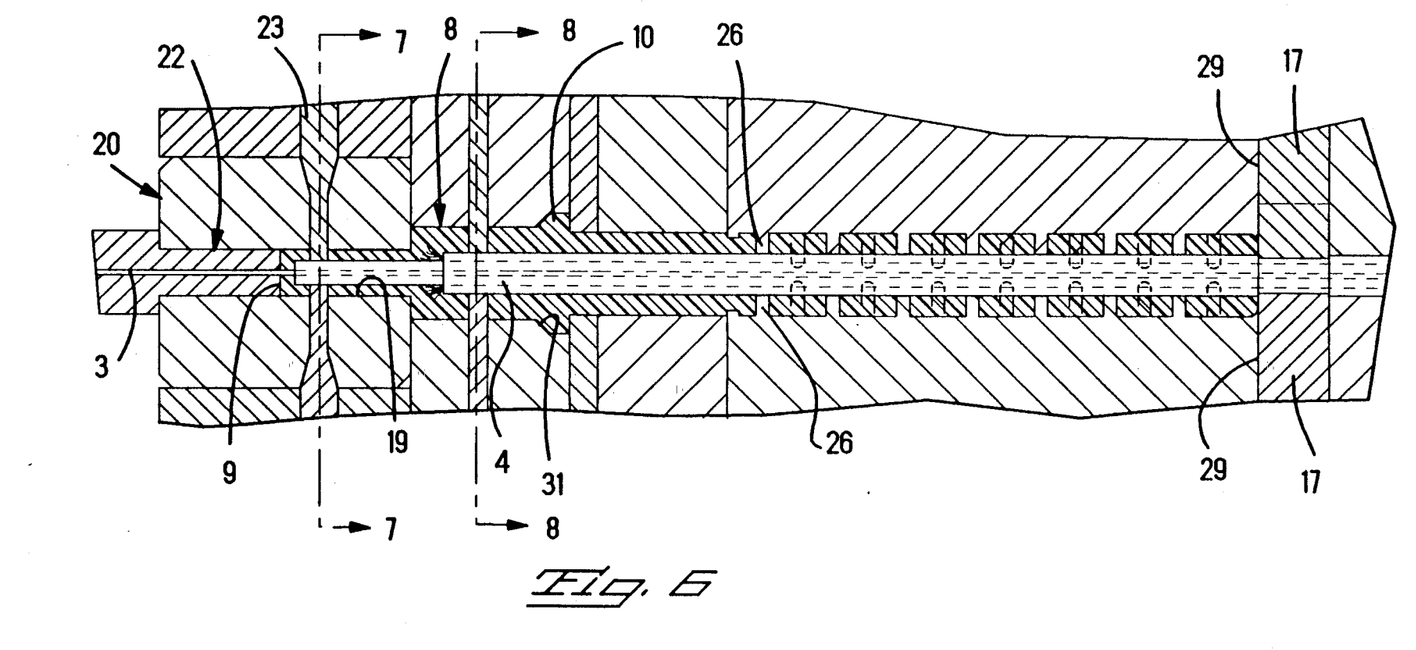
FIG. 6 is a view similar to FIG. 4 illustrating the connector of FIG. 1.
Figure 7:
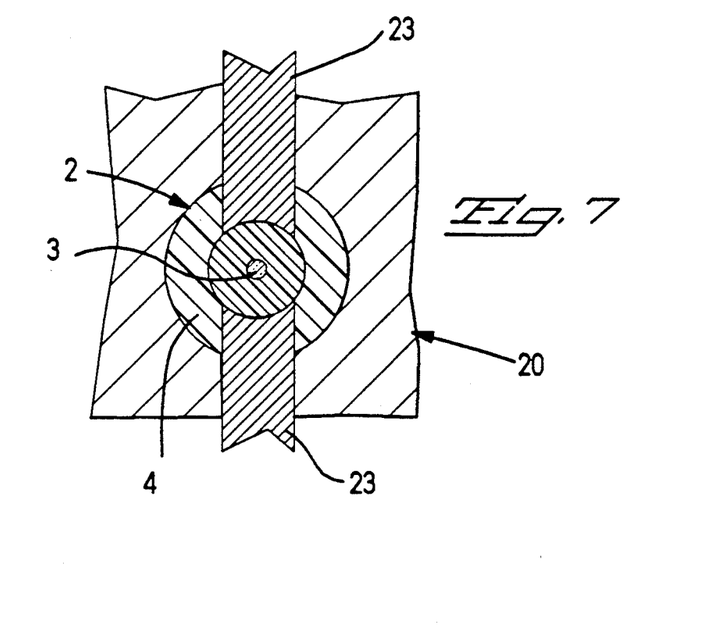
FIG. 7 is a section view along the line 7—7 of FIG. 6.
Figure 8:
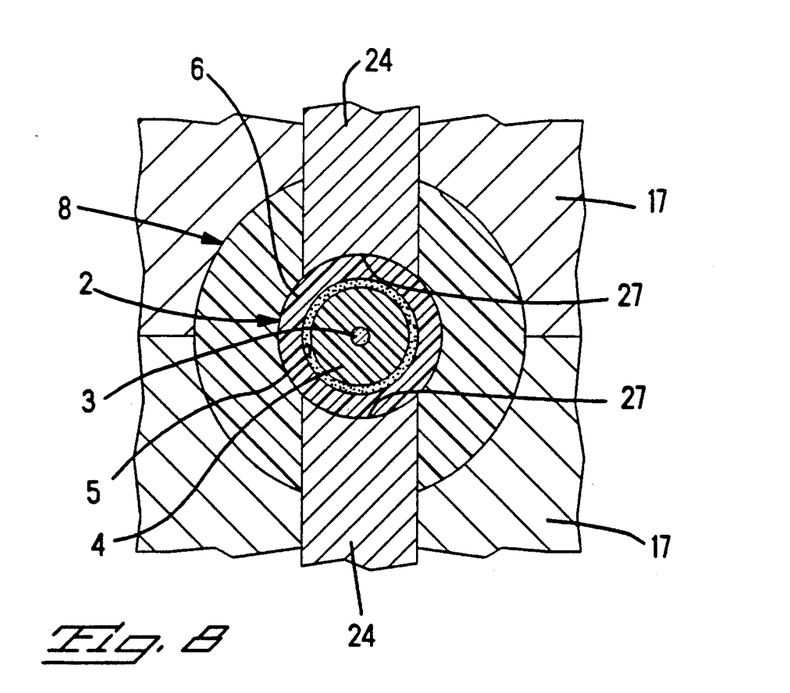
FIG. 8 is a section view along the line 8—8 of FIG. 6.

Stationary locating pins 23, 24 are in corresponding mold inserts 17, 17 and project into the die cavity 16. A first set of the locating pins 23 enter corresponding openings 25 of the cylindrical mold insert 20 and engage therein the buffer 4 covering the optical fiber 3, to support the optical fiber 3 concentrically in the insert cavity 19, and to hold the optical fiber 3 stationary, especially during injection and solidification of fluent plastics material in the die cavity 16 formed by the inserts 17 of the dies 15. Another set of stationary locating pins 24 project into the die cavity 16 and engage the jacket 6 that extends along the die cavity 16. The optical fiber cable 2 comprises a mold insert that is laid along the die cavity 16 and is held concentrically therein by a series of projecting ribs 26 of the corresponding die insert 17. With reference to FIGS. 6 and 8, the pins 24 have concave tips 27 that engage and conform to the cylindrical shape of the jacket 6 of the cable 2. The pins 24 and the ribs 26 hold the jacket 6 concentrically along the die cavity 16 while molten, fluent plastics material 27 is injected into the die cavity 16 to form the holder 8 and the strain relief 12. The ribs 26 form the series of openings 13 in the strain relief 12. With reference to FIG. 6, a rear of the die cavity 16 is closed off by projecting walls 29 of corresponding mold inserts 17 engaging and closing off the die cavity 16 against the cable jacket 6. The holder 8 fabricated in the die cavity 16 is also closed off by corresponding inserts 17. The front 9 of the holder 8 is closed off against the optical fiber 3 by the core pin 22.

With reference to FIG. 3, the molten, fluent plastics material 28 is injected into the die cavity 16 through a mold runner 29 in the die 15. Multiple mold gates 30 intercept the die cavity 16 in spaced part locations and introduces the plastics material 28 into the die cavity 16. The plastics material 28 flows to fill the die cavity 16 and the insert cavity 19. A stepped diameter portion 31, FIG. 6, of the die cavity 16 forms the collar 10 of the connector 1. A groove 32, FIG. 3, of the die cavity 16 forms the key 11 of the connector 1.

Portions of the jacket 6 of the cable 2 may become molten by the elevated temperatures of the molding operation. The mold gates 30 are located along the die cavity 16 and are spaced away from the rear end of the cavity 16 to prevent displacement of the jacket 6 by elevated pressures in the die cavity 16 during the molding operation. The dies 15 mold the unitary holder 8 in the die cavity 16 concentrically over the optical fiber 3, and over the length of buffer 4 and over the corresponding lengths of the strength members 5, to provide a unitary connection to all parts of the cable 2. The holder 8 imbeds the fiber 3, the buffer 4, the strength members 5 and the jacket 6 to provide a strong connection between the holder 8 and the exterior surfaces of all the component parts of the cable 2.

After curing or solidification of the plastics material 28, the solidified holder 8 is removed from the dies 15. The holder 8 is adhered to the exterior of the cable 2 rearward of the strength members 5. The holder 8 has a set of transversely extending, side relief openings 32 intersecting transversely the fiber 3. The openings 32 are left by removal of the corresponding pins 23. The holder 8 has another set of transverse, side relief openings 33 left by removal of the corresponding pins 24, and that intersect transversely the cable 2 and not the fiber 3.

The unitary strain relief 12 of the holder 8 is bendable in arc and is adhered along an exterior of the cable 2. The openings 13 in the strain relief 12 are spaced apart from one another in a series along the cable 2. Edges of the openings 13 defined by the strain relief 12 are adhered to the cable 2. The outer jacket 6 of the cable 2 has become fused to the strain relief 12 of the holder 8, thereby adding to the strength of the connection between the connector 1 and the cable 2.

We claim:

1. An optical fiber connector having an optical fiber holder fabricated in a molding die, and comprising:
   an optical fiber and a flexible buffer and strength members of an optical fiber cable, and a holder of plastics material for aligning the fiber imbedding the fiber in the plastics material at a front end of the holder, and imbedding the buffer and the strength members and an exterior of the cable in the plastics material.

2. An optical fiber connector, as recited in claim 1, comprising: the holder is adhered to the exterior of the cable rearward of the strength members and is closed off against the exterior of the cavity by the molding die.

3. An optical fiber connector as recited in claim 1, comprising: the front end of the holder being rigid, and a rear end of the holder being adhered along the exterior of the cable and forming an arcuately bendable strain relief for the cable.

4. An optical fiber connector as recited in claim 1, comprising: an arcuately bendable strain relief having multiple openings extending in a series along the exterior of the cable, and edges of the strain relief around the openings being adhered to the exterior of the cable.

5. An optical fiber connector as recited in claim 1, comprising: the cable being an insert within the molding die, and the holder imbedding the cable and being closed off by the molding die against the optical fiber and against the exterior of the cable.

6. An optical fiber connector as recited in claim 1, comprising: the holder having a set of side relief openings intersecting the fiber.

7. An optical fiber connector as recited in claim 1, comprising: the holder having side relief openings that intersect the cable and not the fiber.

8. An optical fiber connector as recited in claim 1, comprising, an external collar unitary with the holder.

9. An optical fiber connector, comprising: an optical fiber and a flexible buffer and strength members of an optical fiber cable, and a holder of plastics material for aligning a front end of the fiber and providing a unitary adhered connection with all parts of the cable by imbedding the fiber in the plastics material at a front end of the holder, and by imbedding the buffer and the strength members and an exterior of the cable in the plastics material, and a unitary strain relief of the holder being bendable in arc and adhered along an exterior of the cable.

10. An optical fiber connector as recited in claim 9, comprising: openings in the strain relief in a series along the cable, and edges of the openings being adhered to the cable.

11. An optical fiber connector as recited in claim 9, wherein an outer jacket of the cable is molten fused to the holder.

12. An optical fiber connector as recited in claim 9, wherein an outer jacket of the cable is molten fused to the strain relief.

13. A method of making an optical fiber connector, comprising the steps of:

trimming an optical fiber cable to project from an outer jacket, a length of optical fiber, a length of buffer, and corresponding lengths of strength members, inserting the cable in a molding apparatus, and holding at least an end of the optical fiber concentrically in a cavity of the molding apparatus, molding plastics material to form a unitary holder in the cavity concentrically over the optical fiber, and over the length of buffer and over the corresponding lengths of the strength members, to provide a unitary connection to all parts of the cable.

14. A method as recited in claim 13, further including the steps of:

holding the optical fiber with pins of the molding apparatus, and leaving side relief openings in the holder after withdrawal of the pins from the optical fiber.

15. A method as recited in claim 13, further including the step of:

molding the holder with a strain relief bendable along an arc and adhered to the jacket of the cable.

16. A method as recited in claim 13, further including the step of:

molding the holder with a strain relief bendable along an arc, and molding openings in the strain relief, and adhering edges of the openings to the jacket of the cable.

17. A method as recited in claim 13, and further including the step of:

holding the cable with pins of the molding apparatus, and leaving side relief openings in the holder after withdrawal of the pins from the cable.

* * * * *